(12) United States Patent
Choi et al.

(10) Patent No.: US 9,571,503 B2
(45) Date of Patent: Feb. 14, 2017

(54) METHOD FOR CONNECTING TO NETWORK AND ELECTRONIC DEVICE THEREOF

(71) Applicant: Samsung Electronics Co., Ltd., Gyeonggi-do (KR)

(72) Inventors: Yong-Hae Choi, Gyeonggi-do (KR); Chang-Yeon Yeo, Gyeonggi-do (KR); Jong-Mu Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 136 days.

(21) Appl. No.: 14/475,013

(22) Filed: Sep. 2, 2014

(65) Prior Publication Data
US 2015/0067782 A1    Mar. 5, 2015

(30) Foreign Application Priority Data

Sep. 3, 2013  (KR) ........................ 10-2013-0105779

(51) Int. Cl.
*H04L 29/06*     (2006.01)
*H04W 12/06*    (2009.01)

(52) U.S. Cl.
CPC ............. *H04L 63/102* (2013.01); *H04L 63/08* (2013.01); *H04L 63/10* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 2009/0124284 | A1* | 5/2009 | Scherzer | H04M 1/72561 455/552.1 |
| 2013/0155876 | A1* | 6/2013 | Potra | H04W 36/14 370/248 |
| 2013/0268666 | A1* | 10/2013 | Wilson | H04L 63/08 709/225 |
| 2014/0047510 | A1* | 2/2014 | Belton | H04L 9/32 726/4 |

* cited by examiner

*Primary Examiner* — Fatoumata Traore
(74) *Attorney, Agent, or Firm* — Cha & Reiter, LLC

(57) ABSTRACT

A method and electronic device for network connection and authentication is disclosed herein. A control unit is configured to detect authentication information necessary to access a communication network, and detect whether the authentication information corresponding to the communication network is stored in a profile storing at least the authentication information for at least the communication network. A radio frequency (RF) processing unit configured to couple to the communication network in response to detecting that the authentication information is authenticated by an authentication server for the communication network.

16 Claims, 12 Drawing Sheets

METHOD FOR CONNECTING TO NETWORK AND ELECTRONIC DEVICE THEREOF

CROSS REFERENCE TO RELATED APPLICATION

This application claims priority under 35 U.S.C. §119 to an application filed in the Korean Intellectual Property Office on Sep. 3, 2013 and assigned Serial No. 10-2013-0105779, the contents of which are incorporated herein by reference.

TECHNICAL FIELD

The present disclosure relates to a method for connecting to network and electronic device thereof.

BACKGROUND

The IEEE 802.11 standard continually improves, enhancing performance and quality of service (QoS). Many recent electronic devices such as smart phones, tablet PCs, and portable media players support WiFi interfaces due to the advantage of provided by the IEEE 802.11 standard. As such, wireless local area network (WLAN) technology has become a standard for electronic devices used in a home network (e.g., home or office), and devices that use an internet access such as a real-time audio/video streaming service, mobile voice over internet protocol (VoIP) service, multi-screen services, and an internet protocol television (IPTV) services.

IEEE 802.11i Wi-Fi protected access (WPA) standard is widely used for security, along with a technology referred to as a captive portal (or web authentication) that implements a user authentication and charging system of a wireless network.

SUMMARY

A captive portable generally enables an access point ("AP") to force a user to view a special web page (generally for authentication) before accessing the internet. A captive portal site may be opened through a web browser of an authentication device. For example, a user may open a web browser by using an electronic device, and attempt to access the internet. The captive portal may block all packets irrespective of addresses or ports. Then, the web browser may demand authentication or payment on the part of the user, or display an allowed usage policy, before being re-directed or linked to a web page demanding user submission to a user agreement.

Captive portal technology is mainly used in places where many people enter and exit, such as a hotel and an airport. It provides low-level security for unspecific users rather than corporate-level wireless LAN security authentication, and the authentication scheme thus facilitates a wireless LAN service for people who are paying for the service, such as guests at a hotel. In addition, a captive portal implementing user authentication may restrict a user to web service lasting for some time period, such as, for example, twenty four hours over the span of a week. Re-authentication or a re-purchase of authentication information may thus be required after authentication is expired.

Most portable electronic devices support both cellular network technology and WLAN network technology, allowing users to access the internet through either the cellular network or WLAN network.

In such an environment, when an electronic device accesses an AP providing captive portal type authentication, information on an already accessed AP is stored in an AP profile of the electronic device, so it is possible to automatically re-access the AP using the stored information within the AP profile. Even if the corresponding AP completes authentication, the electronic device may attempt to re-access because information on the corresponding AP remains in the AP profile. However, if the electronic device attempts to re-access after authentication has expired, a state in which there is no internet access is maintained, and the internet service may be terminated.

In other words, when the electronic device re-accesses the corresponding AP after captive portal type authentication has expired, the electronic device may be in a state where it is connected to the corresponding AP but with limited internet service. A user may thus have difficulty utilizing an email push service or a messenger service.

The present disclosure provides methods and devices for maintaining the continuity of internet access by preventing undesired access when re-accessing an AP supporting captive portal technology.

The present disclosure also provides methods and devices for providing continuous internet service connectivity to a user by regularly checking the authentication state of the captive portal and switching to a cellular network when internet service connectivity is lost.

The present disclosure also provides methods and devices providing a seamless internet service user experience by an electronic device that uses a cellular network and a WLAN.

According to an aspect of the present disclosure, a method of an electronic device is disclosed. The method includes detecting authentication information necessary to access a communication network, detecting whether the authentication information corresponding to the communication network is stored in a profile storing at least the authentication information for at least the communication network, and coupling to the communication network in response to detecting that the authentication information is authenticated by an authentication server for the communication network.

According to another aspect of the present disclosure, a method of connecting to a communication network by using an electronic device is disclosed. The method includes detecting whether an access point (AP) uses a captive portal authentication when establishing communication to the AP, retrieving AP profile information when the AP uses the captive portal authentication, detecting, based on the AP profile information, whether the captive portal authentication with the AP was successful in a previous communication with the AP, and limiting access to the AP when the captive portal authentication with the AP was not successful in the previous communication.

According to another aspect of the present disclosure, an electronic device is disclosed, including a control unit configured to detect authentication information necessary to access a communication network, and detect whether the authentication information corresponding to the communication network is stored in a profile storing at least the authentication information for at least the communication network. A radio frequency (RF) processing unit is configured to couple to the communication network in response to detecting that the authentication information is authenticated by an authentication server for the communication network.

According to another aspect of the present disclosure, an electronic device is disclosed, including an RF processing unit configured to communicate with an access point (AP). A control unit is configured to detect whether the AP uses a captive portal authentication when establishing communication with the AP, retrieve AP profile information when the AP uses the captive portal authentication, detect, based on the AP profile information, whether the captive portal authentication with the AP was successful in a previous communication with the AP, and limit access to the AP when the captive portal authentication with the AP was not successful in the previous communication.

The limiting access to the AP may include at least one of deactivating an automatic access function for establishing communication to the AP, and deleting authentication information for the AP from the AP profile information.

The method may further include determining whether the authentication through the captive portal is effective when the authentication through the captive portal in the previous connection is successful, and limiting a connection to the one AP when the authentication through the captive portal is ineffective.

The method may further include displaying on a screen of the electronic device a message indicating that the captive portal authentication is required.

The AP profile information may include at least one of information indicating whether the AP uses the captive portal authentication, and information indicating whether authentication based on the captive portal authentication was previously successful.

BRIEF DESCRIPTION OF THE DRAWINGS

The present disclosure will become more apparent from the following detailed description when taken in conjunction with the accompanying drawings in which.

DETAILED DESCRIPTION

Various embodiments of the present disclosure are described below in detail with reference to the accompanying drawings. In addition, when describing various embodiments of the present disclosure, detailed descriptions of related known functions or configurations will be ruled out when it is determined that they may unnecessarily obscure subject matters of various embodiments of the present disclosure. In addition, since the terms to be described below are defined in consideration of functions in various embodiments of the present disclosure, they may vary depending on an operator intention or practice. Therefore, the definition needs to be made based on details throughout the present disclosure.

Various embodiments may describe on a method and device for maintaining the continuity of an internet access by preventing undesired access when re-accessing an access point (AP) supporting captive portal technology.

In various embodiments of the present disclosure, an AP supporting captive portal technology may be a hotspot AP installed in a public space and may implement a login process for users accessing internet service. The login process may correspond to an authentication procedure that is performed before allowing internet service that is activated when an electronic device initially connects to an AP.

In various embodiments of the present disclosure, 'profile information' may mean information on APs to which an electronic device has previously connected. In various embodiments of the present disclosure, the profile information is stored in and managed by an electronic device, and the profile information may further include at least one of information indicating whether an AP uses the captive portal technology, and information indicating whether captive portal web authentication is successful, in addition to the information disclosed above.

An electronic device may include a short-range communication module, and may be a portable electronic device, portable terminal, a mobile terminal, a mobile pad, a media player, a tablet computer, a handheld computer, a personal digital assistant (PDA), a server, or a personal computer (PC), for example. Also, the electronic device may include a device that combines two or more functions of such devices.

Figure 1:
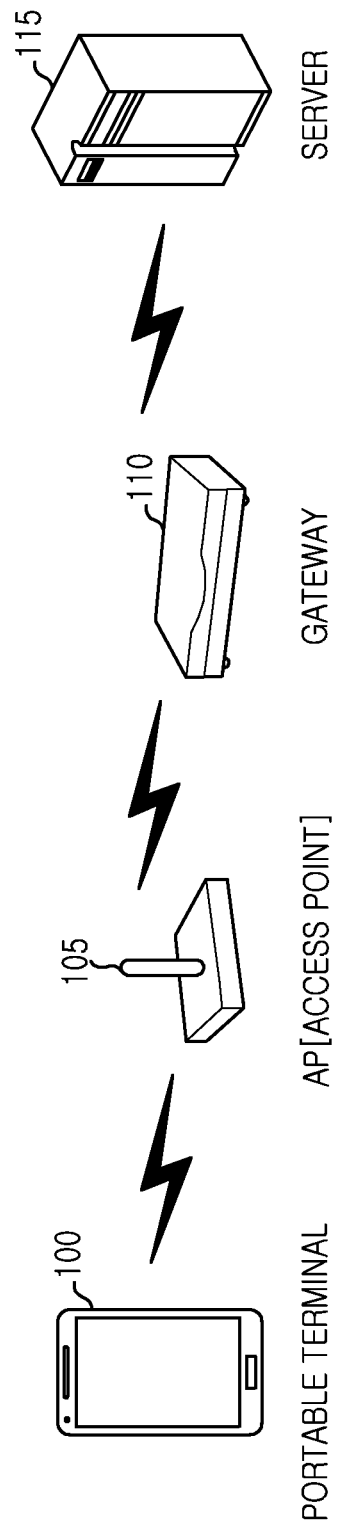
FIG. 1 is a schematic diagram of an example internet service system according to various embodiments of the present disclosure.

FIG. 1 is a schematic diagram of an example internet service system according to various embodiments of the present disclosure.

An electronic device 100 is a device carried by a user, includes a short-range communication module for an access to an AP, and may also perform an internet access through a cellular network. A detailed description of the electronic device 100 is provided in FIG. 2 below.

An AP 105 may correspond to a base station supporting the wireless access and network connection of the electronic device 100.

The AP 105 may be connected to the electronic device 100, transmit a signal received from the electronic device 100 to a gateway 110 and transmit a signal received from the gateway 110 to the electronic device 100. In various embodiments of the present disclosure, the AP 105 may correspond to a hotspot AP or a general AP.

The gateway 110 is a component corresponding to an intermediate manager between the AP 105 and a service provider server 115. In various embodiments of the present disclosure, the gateway 110 may transmit a redirection message to the AP 105 when it receives from the AP 105 a hypertext transfer protocol (HTTP) request generated from the electronic device 100. Alternatively, when receiving from the AP 105 a HTTP "GET" message generated from the electronic device 100, the gateway may transmit a response message to the HTTP "GET" message to the AP 105.

The gateway 110 transmits an authentication request to the service provider server 115, when receiving a message including user authentication information (including for example an identifier "ID" and password "PW") from the AP 105. When receiving an authentication response from the service provider server 115, the gateway 110 may transmit a login success notification to the AP 105. The gateway 110 may transmit a message "Start Accounting" to the service provider server 115, and receive in response an acknowledgement from the service provider server 115.

Also, the gateway 110 may transmit a message "Stop Accounting" to the service provider server 115 when receiving a logoff request from the AP 105, and transmit a logoff notification to the AP 105 after receiving an acknowledgement from the service provider server 115.

The service provider server 115 is a server that generally manages an internet service through the AP 105, and may control login, authentication, logoff, and accounting operations of the electronic device 100. The service provider server 115 may perform communication with the electronic device 100 through the AP 105 and the gateway 110. When receiving an authentication request including user authentication information (ID and PW) from the gateway 110, the service provider server 115 may perform a user authentication procedure through the user authentication information. The service provider server 115 may transmit an authentication response including acceptance information to the gateway 110 when it is determined that a user of the electronic device 100 is an authenticated user, and transmit an authentication response including denial information when it is determined that the user of the electronic device 100 is not an authenticated user.

When receiving a "Start Accounting" message from the gateway 110, the service provider server 115 transmits an acknowledgement to the gateway 110 and starts accounting related to the internet usage of the electronic device 100. Also, when receiving a "Stop Accounting" message from the gateway 110, the service provider server 115 transmits an acknowledgement to the gateway 110 and may stop accounting related to the internet usage of the electronic device 100.

In various embodiments, the service provider server 115 may not perform the accounting function. For example, when an internet service is provided to a user for free, the procedure of controlling accounting may be unnecessary.

Figure 2:
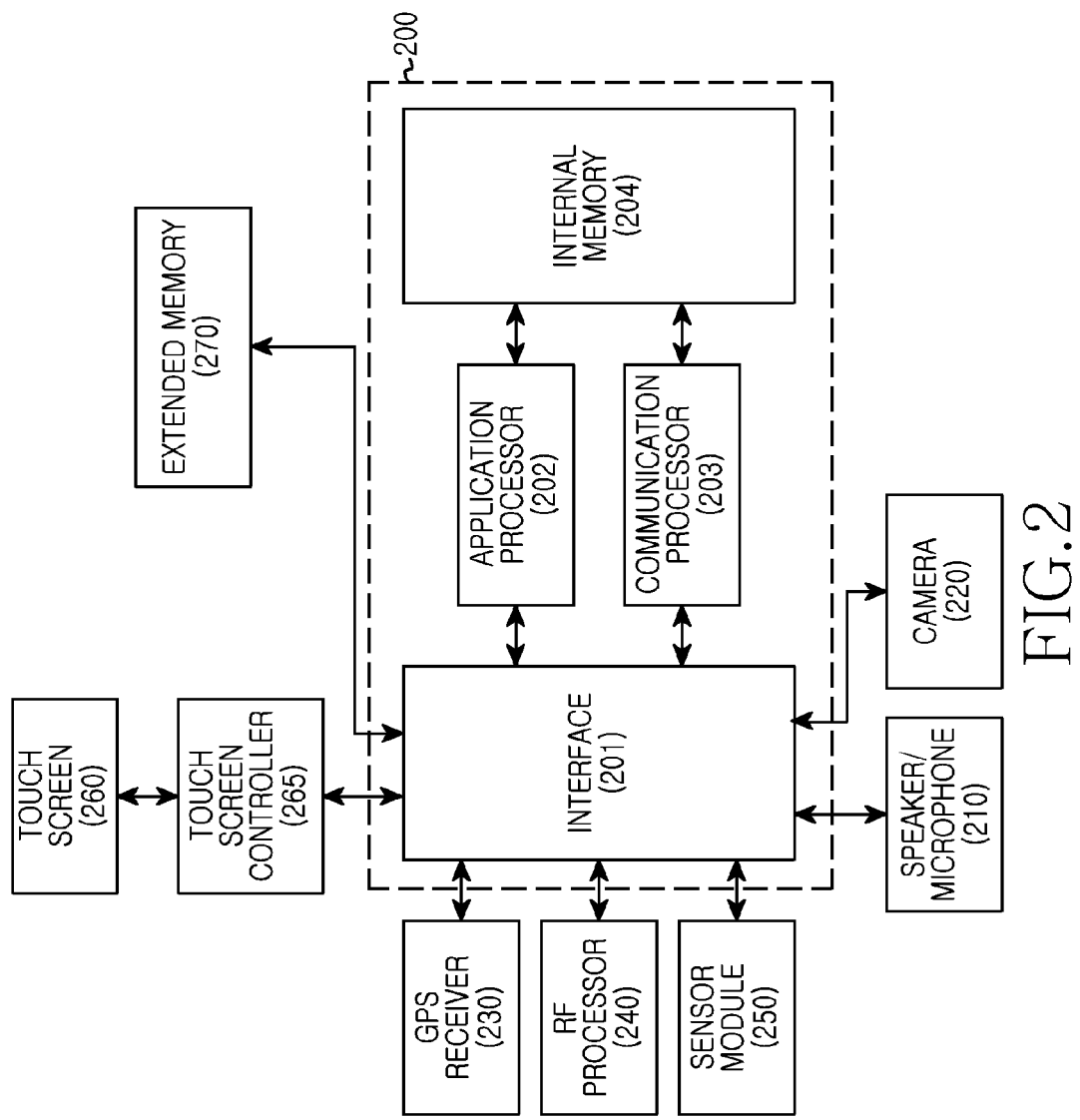
FIG. 2 is a schematic diagram of an example electronic device according to various embodiments of the present disclosure.

FIG. 2 is a schematic diagram of an example electronic device according to an embodiment of the present disclosure.

Referring to FIG. 2, the electronic device includes a controller 200, a speaker/microphone 210, a camera module 220, a GPS receiver 230, a radio frequency (RF) processor 240, a sensor module 250, a touch screen 260, a touch screen controller 270, and an extended memory 1170.

The controller 200 may include an interface 201, one or more processors 202 and 203, and an internal memory 204. In some cases, the controller 200 itself may be referred to also as a processor. The interface 201, the application processor 202, the communication processor 203, and the internal memory 204 may be separate components or be in one or more integrated circuits.

The application processor 202 may execute many software programs to perform many functions for the electronic device and the communication processor 203 may perform processing and control for voice communication and data communication. Also, in addition to such typical functions, the processors 202 and 203 may also play a role of executing specific software modules (an instruction set) stored in the extended memory 270 or the internal memory 204 and performing specific many functions corresponding to the modules. For example, the processors 202 and 203 may perform a method of connecting to an AP by the electronic device in linkage with software modules stored in the extended memory 270 or the internal memory 204 (as illustrated in, for example, FIGS. 3-7).

The interface 201 couples the touch screen controller 265 of the electronic device to the extended memory 270.

The sensor module 250 is coupled to the interface 201 and enables a plurality of functions. For example, a motion sensor and an optical sensor are coupled to the interface 201 and may sense a motion of the electronic device and sense an external light, respectively. In addition, other sensors such as a positioning system, a temperature sensor and a bio-sensor may be connected to the interface 201 to perform related functions.

The camera module 220 is coupled to the sensor module 250 through the interface 201 and may perform a camera function such as picture and video clip recording.

The RF processor 240 performs a communication function. For example, the RF processor 1140 may convert an RF signal into a baseband signal under the control of the communication processor 203 and provide a signal obtained through the conversion to the communication processor 203, or convert the base band signal from the communication processor 203 into the RF signal and transmit a signal obtained through the conversion. In this example, the communication processor 203 may process the base band signal by using various communication techniques. For example, the communication techniques may include, but not be limited to, global system for mobile communication (GSM), enhanced data GSM environment (EDGE), code division multiple access (CDMA), W-code division multiple access (W-CDMA), long term evolution (LTE), orthogonal frequency division multiple access (OFDMA), wireless fidelity (Wi-Fi), WiMax and/or Bluetooth communication techniques.

The RF processor 240 based on a short-range communication technique may perform a scan operation over all channels, transmit a probe request to the AP 105, and receive a probe response from the AP 105. Accordingly, the electronic device 100 may search for the AP 105. Also, when a request for an association with the AP 105 arises by a user, the RF processor 240 transmits an association request to the AP 105 and receives an association response from the AP 105. Accordingly, the electronic device 100 may be associated with the AP 105.

In various embodiments of the present disclosure, while the electronic device 100 is connected to the AP 105, the RF processor 240 may transmit an HTTP request or an HTTP "GET" message to the AP 105 and receive a redirection message or a response message to the HTTP "GET" message from the AP 105. Also, a short-range communication module unit 130 may transmit an authentication request message generated by the control unit 170 to the AP 105 and receive a "login success" notification from the AP 105.

The speaker/microphone 210 may be responsible for audio stream input and output, such as voice recognition, voice copy, digital recording and call functions. That is, the speaker/microphone 210 may convert a voice signal into an electrical signal or convert the electrical signal into the voice signal. Although not shown, an earphone, a head phone, or a head set that is attachable and detachable may be connected to the electronic device through an external port.

The touch screen controller 265 may be coupled to the touch screen 260. The touch screen 260 and the touch screen controller 265 may use, but are not limited to, capacitive, resistive, infrared, and surface acoustic wave technologies for determining one or more contact points with the touch screen 260, and any multi-touch sensing technology including a proximity sensor arrangement or other elements to detect a contact or motion, or an interruption in contact or motion.

The touch screen 260 may provide input/output interfaces between the electronic device and a user. That is, the touch screen 260 may deliver a user's touch inputs to the electronic device. The touch screen 260 may also display output information from the electronic device to the user. For example, the touch screen may display visual outputs in a text, graphic, or video format or in a combined format thereof.

Figure 8:
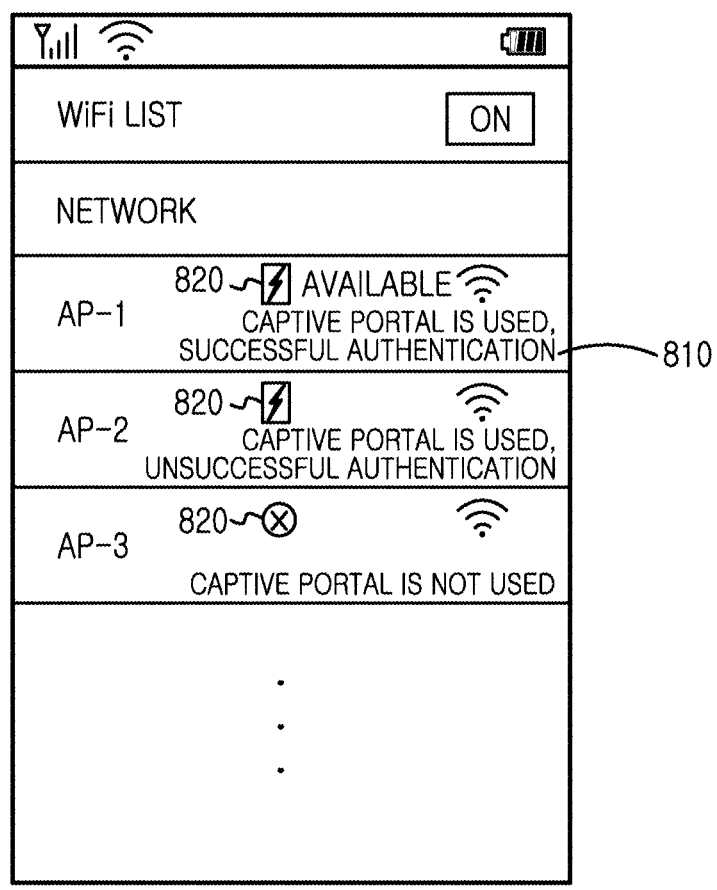
FIG. 8 illustrates an example screen for a network configuration according to various embodiments of the present disclosure.
Figure 9:
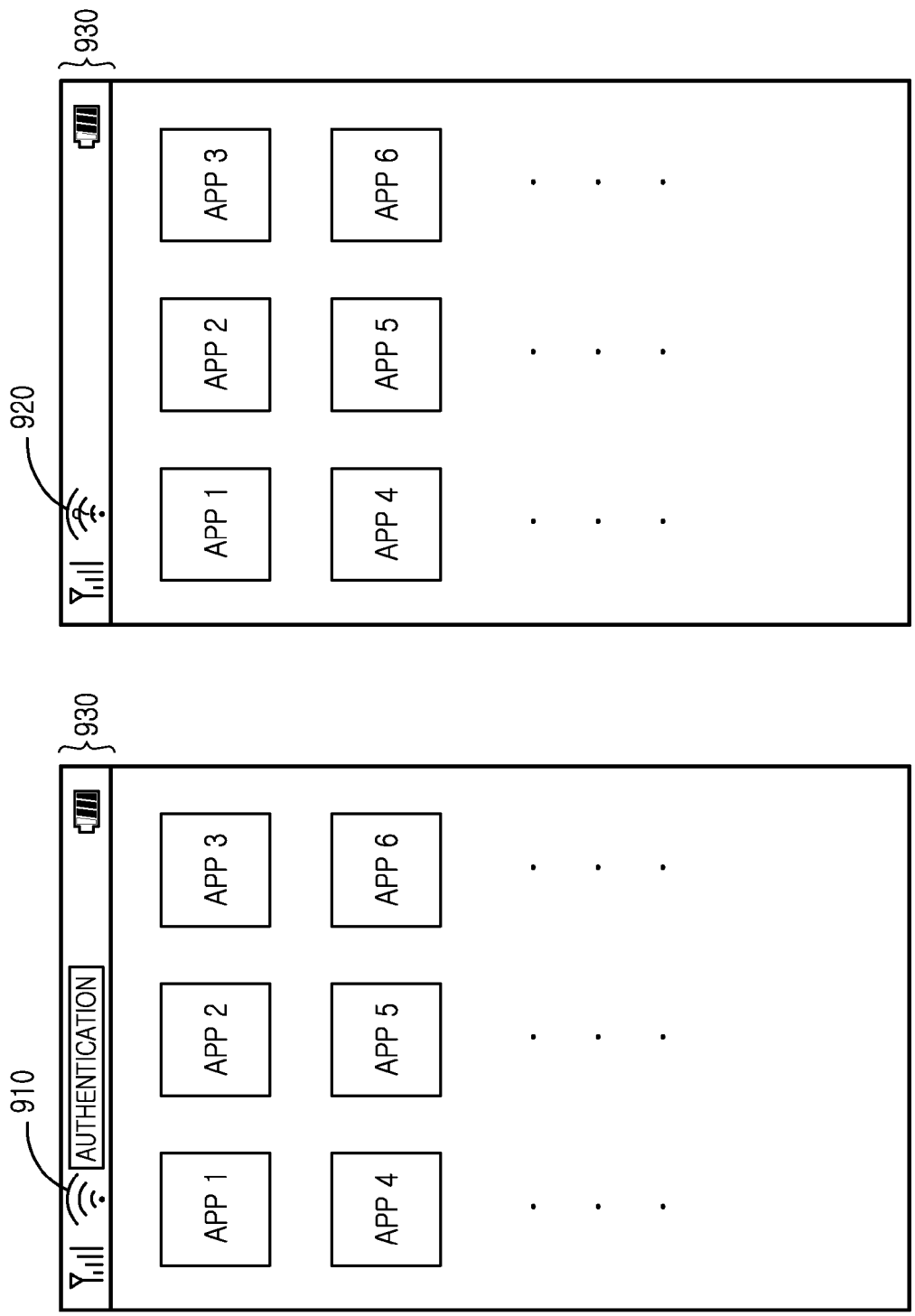
FIG. 9A and FIG. 9B illustrate example screens showing information on whether a captive portal is used and whether authentication is successful upon access to a corresponding AP according to various embodiments of the present disclosure.
Figure 10:
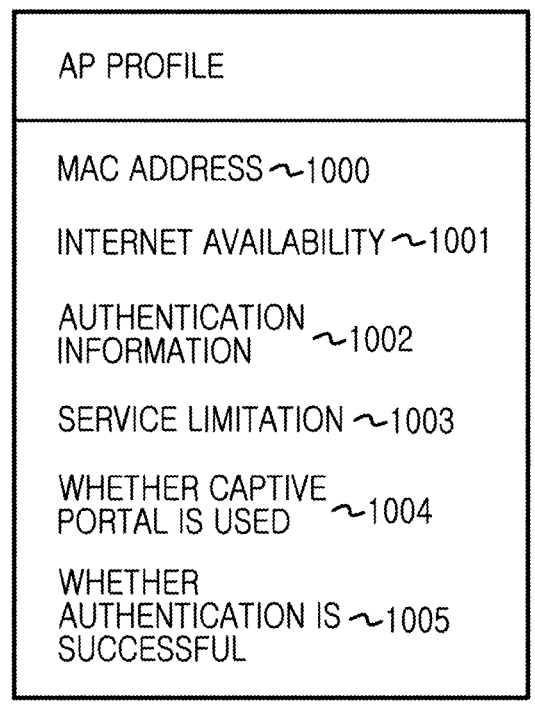
FIG. 10 illustrates the profile details of a corresponding AP according to various embodiments of the present disclosure.
Figure 11:
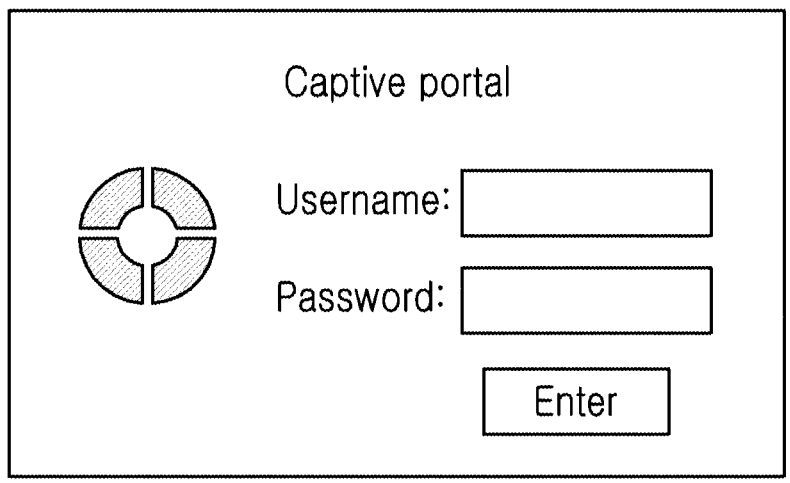
FIG. 11 illustrates an example captive portal authentication screen according to various embodiments of the present disclosure.

In various embodiments of the present disclosure, the touch screen 260 may display a list of APs including information on whether a captive portal is used and whether authentication is successful upon connection to a corresponding AP (as illustrated in FIG. 8 and described further below), display information on whether it is a captive portal and whether authentication is successful upon connection to a corresponding AP (as illustrated in FIG. 9A and described further below), display the profile details of a corresponding AP according to various embodiments of the present disclosure (as illustrated in FIG. 10 and described further below), or display a captive portal authentication screen (as illustrated in FIG. 11 and described further below).

Also, it is possible to display information on whether the currently connected AP 105 may use the internet. Also, before the electronic device 100 logs into the AP 105, the tough screen 260 may display a message to select whether to log into the AP 105 when profile information on the AP 105 includes a service limitation. The message may include information on a service limitation.

Many displays may be used for the touch screen 260. For example, a liquid crystal display (LCD), a light-emitting diode (LED), a light-emitting polymer display (LPD), an OLED (Organic Light Emitting Diode), an active matrix organic light emitting diode (AMOLED) or a flexible LED (FLED) may be used but the present disclosure is not limited thereto.

The GPS receiver 230 may receive a signal from an artificial satellite and generate information such as a position, a speed, or a time. For example, the distance between the satellite and the GPS receiver is calculated by multiplying the speed of light by a signal arrival time, the accurate positions and distances of three satellites are found, and the position of the electronic device is measured by using a known triangulation principle.

The extended memory 270 or the internal memory 204 may include non-volatile memories and/or high-speed random access memories such as one or more magnetic disk storage devices, one or more optical storage devices and/or flash memories (for example, NAND or NOR memory).

The extended memory 270 or the internal memory 204 may store software. Software components include an operating system, a software module, a communication software module, a graphic software module, a user interface software module and an MPEG module, a camera software module, one or more application software modules, etc. Also, since the module that is the software component may be indicated by an instruction set, the module may also defined by the instruction set. The module may also be defined by a program.

The operating system software may include many software components that control general system operations. The control of such general system operations may mean memory management and control, storage hardware (device) control and management, power control and management, etc. Such operating system software may also perform a function of making the communication between many hardware pieces and software components (modules) smooth.

In various embodiments of the present disclosure, the extended memory 270 or the internal memory 204 may store profile information that is information on previously connected APs. The profile information may include a 'MAC address', 'internet availability', 'authentication information', and a 'service limitation'. The 'internet availability' may correspond to information on whether the AP 105 may use the internet. The 'authentication information' is unique information on a user for the process of logging into the AP 105 and may include a user ID and a password. The 'service limitation' is a limitation when using the AP 105, and may include a limitation on a time or a limitation on data capacity. According to various embodiments of the present disclosure, the profile information may further include at least one of pieces of information indicating whether the AP uses the captive portal technology and information indicating whether web authentication based on the captive portal technology is successful, in addition to the information recited above.

The communication software module may enable communication with other electronic devices such as a computer, a server and/or a portable terminal through the RF processor 240. In addition, the communication software module has a protocol structure that corresponds to a corresponding communication technique.

The graphic software module may include many software components for providing and displaying graphics to the touch screen 260. The term "graphics" is interpreted here to include, for example, text, web pages, icons, digital images, videos, or animation and other visual representations on the touch screen 260.

The user interface software module may include many software components associated with the user interface. The user interface software module may include details of how the state of the user interface is changed or under which condition the state of the user interface is changed.

The camera software module may include camera related software components that enable camera related processes and functions. The application module may include a web browser including a rendering engine, an e-mail function, an instant message function, a word processing function, a keyboard emulation function, an address book function, a touch list function, a widget function, a digital right management (DRM) function, a voice recognition function, a voice copy function, a position determining function, a location based service, etc. The internal memory 204 and extended memory 270 may include further part-software modules (e.g., instruction sets executable by a processor) in addition to the above-described modules. Alternatively, some modules or instruction sets may not be used in some cases.

In relation to the present disclosure, the application module may include instructions (see FIGS. 3A to 7 below) for connecting to the AP by the electronic device.

The internal configuration of the electronic device 100 according to various embodiments of the present disclosure has been described above, and a method of connecting to the AP to be implemented in the electronic device 100 will be described below.

Figure 3A:
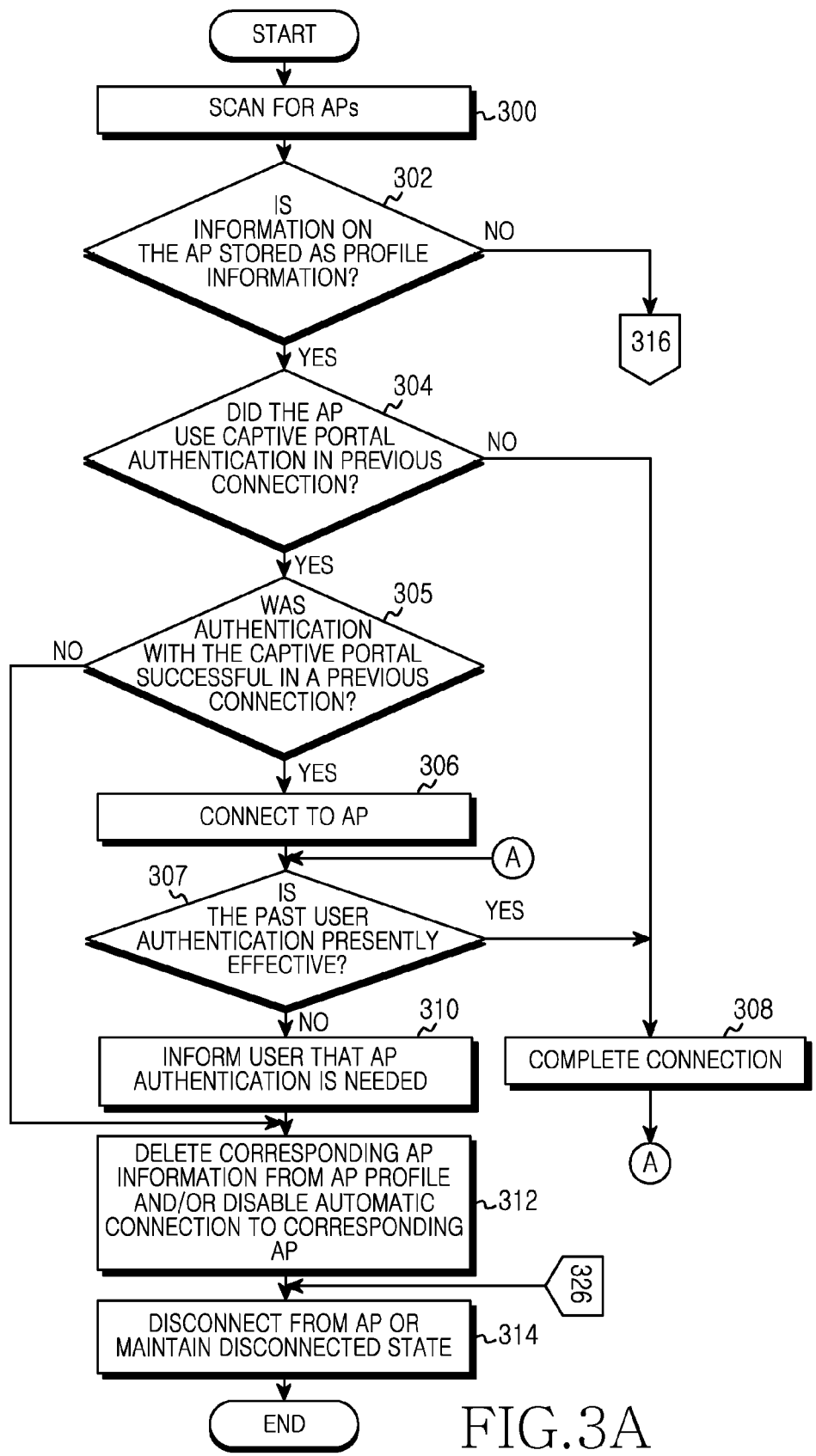
FIG. 3A and FIG. 3B illustrate an example sequence of steps for connecting to an access point by an electronic device according to various embodiments of the present disclosure.
Figure 3B:
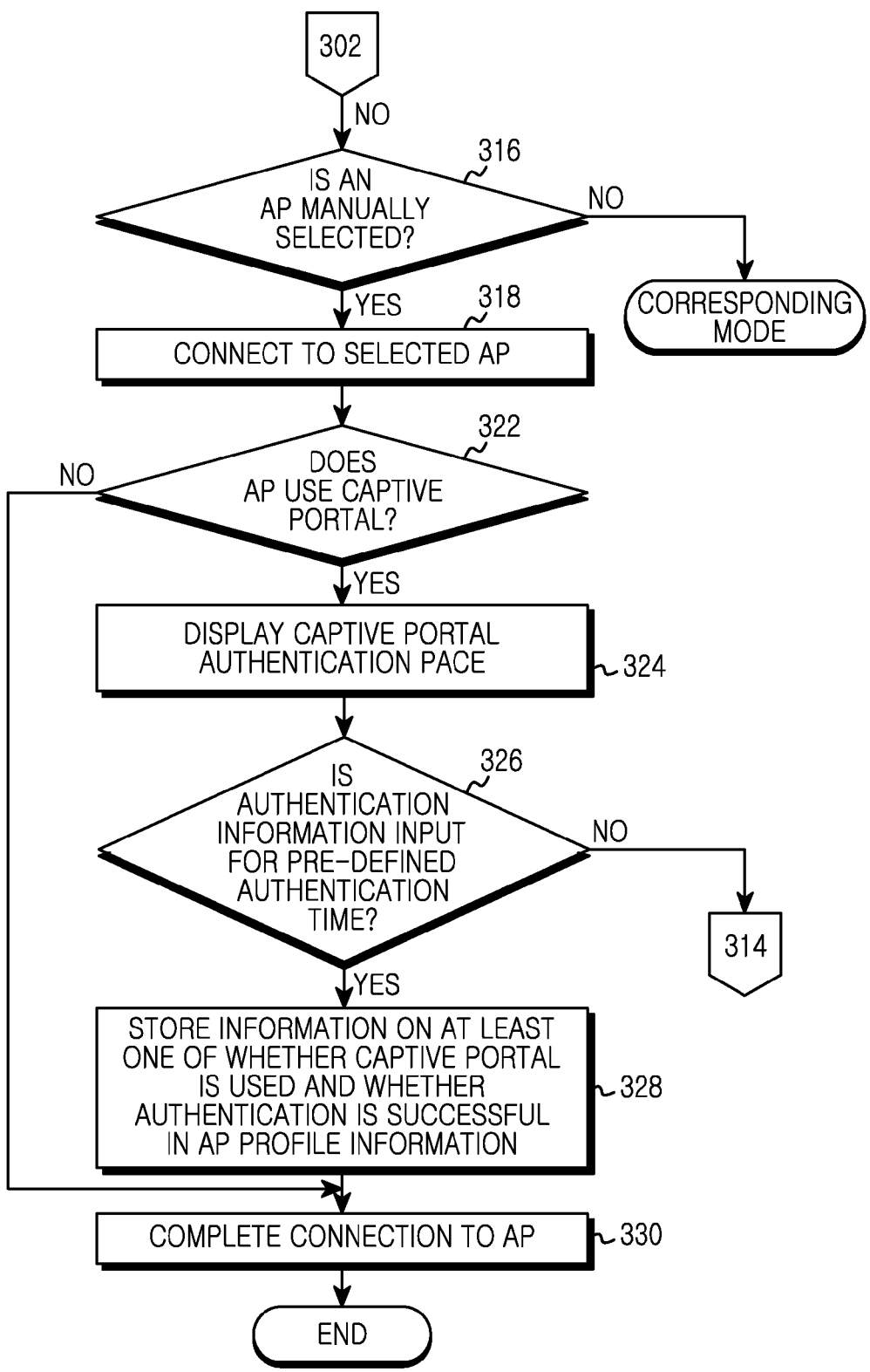

FIGS. 3A and 3B illustrate an example sequence of steps for connecting to an access point by an electronic device according to various embodiments of the present disclosure Referring to FIG. 3A, the application processor 202 may perform an AP scan operation through the RF processing unit 240 and search for APs near the electronic device 100 in step 300.

When at least one AP has been found, and a connection with the particular AP is desired, the application processor 202 may determine whether information on the particular AP is stored as profile information in step S302. If the electronic device 100 has previously connected to the AP at least once, information on the AP will be stored in the profile information. If the electronic device 100 has not previously connected to the AP, information on the AP will not be stored in the profile information.

When the information on the AP to connect is stored as profile information, as determined in step 302, then in step 304, the application processor 202 may determine whether the AP utilized a captive portal in the previous connection, based on information on in the profile information indicating, for example, whether the captive portal information for previously connected Aps, and whether captive portal web authentication was previously successful.

If it is determined that the AP has previously used the captive portable technology in in step 304, then in step 305, the application processor may check whether authentication with the captive portal was successful in the previous connection.

If it is determined that the AP did not use the captive portable in the previous connection, then in step 308, the application processor may complete an AP connection. In some embodiments, after completing the AP connection, a redirection message may be regularly checked, and after checking whether an existing authentication has expired, it is possible to store information on the authentication state in profile information. In addition, if the existing captive portal authentication expires, it is possible for a user to select re-authentication or disconnection from the corresponding AP via a notification prompt.

If it is determined in step 305 that authentication on the captive portal was successful in a previous connection, the application processor may proceed to step 306, and if authentication on the captive portal was unsuccessful in the previous connection, the application processor may proceed to step 312.

In step 306, the application processor 202 may connect to the AP through the RF processing unit 240. In step 307, the application processor 202 may determine whether user authentication on the previous connection on the captive portal is presently effective. In some embodiments of the present disclosure, the application processor 202 may determine whether the user authentication is effective by checking a redirection message received from the AP. In some embodiments of the present disclosure, the application processor 202 may check and determine a pre-stored user authentication expiration period.

When it is determined in step 307 that the user authentication from the previous connection to the captive portal is presently effective, the application processor 202 may in step 308 complete connection to the AP.

When it is determine in step 307 that the user authentication from the previous connection to the captive portal is not presently effective (e.g., if the user authentication period has expired), then in step 310, the application processor 202 may inform the user that AP authentication is needed, and/or the authentication information related to the captive portal on the AP has expired. In this example, informing the user that AP authentication is needed or captive portal authentication on the AP has been expired may indicate that an automatic re-connection to the AP is not subsequently performed.

In some embodiments of the present disclosure (such as in FIG. 9B and as described below), an indicator 920 is displayed indicating that captive portal authentication on a corresponding AP has expired. The indicator 920 may be displayed on, for example, a state display region of a user interface displaying other indicators related to, for example, a signal intensity of an antenna, a battery state, and a WLAN connectivity. In some embodiments of the present disclosure, a user may be informed that captive portal authentication on a corresponding AP has expired using, for example, a message box or a popup window.

In step 312, the application processor 202 may delete the information corresponding to the connected AP from the profile information (as the authentication information is no longer valid, as determined in step 307), and/or disable automatic connection to the AP, preventing subsequent automatic connections. Accordingly, in some embodiments of the present disclosure, it is possible to prevent an automatic connection to the AP by deactivating an automatic connection function.

In various embodiments of the present disclosure, steps 310 and 312 may be performed independently or together.

In step 314, the application processor 202 may then be disconnected from an AP (to which it was previously connected in step 306) or maintain an existing disconnected state.

When it is determined in step 302 that information on the AP is not stored as profile information, then in step 316, the application processor 202 may detect whether any one of found APs (via the scanning operation in step 300) is manually selected via user input. If manual user input designates an AP for connection, then in step 318, a connection may be made to the AP manually selected by the user input. If the corresponding AP is not manually selected by the user input, the application processor may enter a corresponding mode. For example, the application processor 202 may enter a corresponding mode, and be disconnected from the AP, or maintain a disconnected state if one already exists.

In step 322, the application processor 202 may determine whether the selected AP uses the captive portal technology. That is, after a connection to the AP, the application processor 202 may determine whether the selected AP uses captive portal authentication. In some embodiments of the present disclosure, the application processor 202 may transmit a message HTTP "GET" message to an address while connected to the AP, determine whether a response to the message HTTP "GET" is received, and determine, based on the response, whether the selected AP uses captive portal authentication. In other embodiments of the present disclosure, the application processor 202 may determine whether a redirection message to a captive portal authentication page is received, and determine, based on the redirection message, whether the selected AP uses captive portal authentication.

If, in step 322, it is determined that the AP uses a captive portal authentication, then in step 324, the application processor 202 may open and display a captive portable authentication page in a web browser via the received redirection message. If, in step 322, it is determined that the AP does not use the captive portal authentication, the application processor 202 may proceed to step 330 and complete the connection to the AP.

In step 326, it is determined whether user authentication information (e.g., ID and PW) is input to a captive portal authentication page for a pre-defined authentication time in step 326 (and if accurate user authentication information has been input), then in step 328, the application processor 202 may store information related to captive portal authentication on the connected AP, such as information indicating at least whether the AP uses a captive portal and/or whether captive portal authentication is successful.

In step 326, if it is determined that user authentication information (e.g., user ID and password) is not input to a captive portal authentication page for a pre-defined time in step 326, then in step 314, application processor 202 may disconnect from the AP, or maintain a disconnected state if one already exists.

In step 330, the application processor 202 may complete a connection to the AP.

In various embodiments of the present disclosure, after completing a connection to the AP, it is possible to display that the selected AP uses captive portal authentication. For example, as shown in FIG. 9A, which will be described below, it is possible to display this information using an indicator 910, thus visually notifying a user that a corresponding AP uses captive portal authentication. The indicator may be shown on a state display region configured to show, for example, a signal intensity of an antenna, a battery state, and/or a WLAN connectivity using visual indicators. In some embodiments of the present disclosure, it is also possible to inform a user that a corresponding AP uses captive portal authentication using a message box or a popup window.

After completing a connection to the AP, the application processor 202 may regularly transmit a HTTP "GET" message to a specific address, receive a response to the HTTP "GET" message, or receive a redirection message to a captive portal authentication page. Accordingly, the application processor 202 may then update the captive portable authentication state information of the AP in the profile information, and display a result by using an indicator (element 910 as illustrated in FIG. 9A and described further below).

Figure 4:
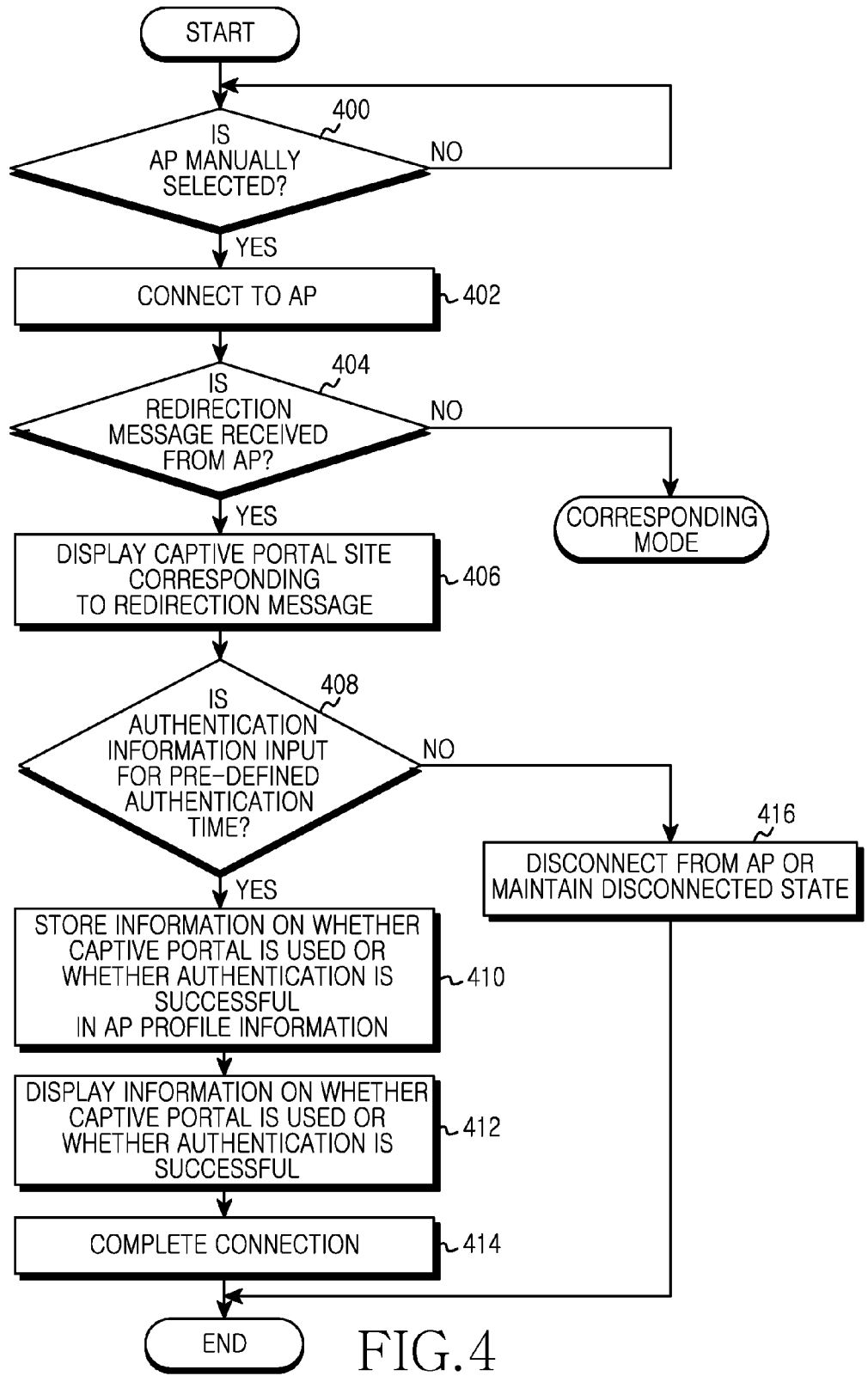
FIG. 4 illustrates an example sequence of steps for manually connecting to an access point by an electronic device according to various embodiments of the present disclosure.

FIG. 4 illustrates an example sequence of steps for manually connecting to an access point of by electronic device according to various embodiments of the present disclosure.

Referring to FIG. 4, in step 400, when a corresponding AP is manually selected by a user input from a list of APs, then in step 402, the application processor 202 may connect to a selected AP, and in step 404, determine whether a redirection message is received through the connection to the AP.

If in step 404, the redirection message is received through the connection to the AP, then in step 406, the application processor 202 may open a captive portal authentication page corresponding to the redirection message and display the authentication page. If in step 404, the redirection message is not received through the connection to the AP, the application processor may enter a corresponding mode and complete the connection to the AP. In other words, when a redirection message is received via connection to the AP, it may be confirmed that the AP uses captive portal authentication, and when the redirection message is not received through the connection to the AP, it may be confirmed that the AP does not use captive portal authentication.

In step 408, when user authentication information (e.g., ID and PW) is input to a captive portal authentication page for a pre-defined authentication time (assuming that the user authentication information is valid and accurate), then in step 410, the application processor may store in the profile information captive portal authentication information on the selected and connected AP, such as, for example, at least one of information on whether the AP uses a captive portal, and whether captive portal authentication is successful.

In step 408, when user authentication information (e.g., user ID and password) is not input to a captive portal authentication page for a pre-defined time in step 408, then in step 416, the application processor 202 may disconnect from the AP or maintain a disconnected state if one already exists.

In step 412, the application processor 202 may display information on whether the selected AP uses captive portal authentication or whether the captive portal authentication is successful. For example, as illustrated in FIG. 9A and described further below, it is possible to display, by using an indicator (element 910 of FIG. 9A), information on whether the selected AP uses captive portal authentication or whether captive portal authentication is successful. The information may be displayed on a state display region showing, for example, a signal intensity of an antenna, a battery state, and a WLAN connectivity using a number of indicators. In some embodiments of the present disclosure, it is possible to show information on whether the selected AP uses captive portal authentication or whether the captive portal authentication is successful to a user through a message box or a popup window.

In step 414, the application processor 202 may complete the connection to the AP.

Also, after completing the connection to the AP, the application processor 202 may regularly transmit a HTTP "GET" message to a specific address, receive a response to the message HTTP "GET" message, or receive a redirection message to a captive portal authentication page, update captive portable authentication state information on the AP on the profile information, and display a result by using an indicator (element 910 in FIG. 9A, which will be further described below).

Figure 5:
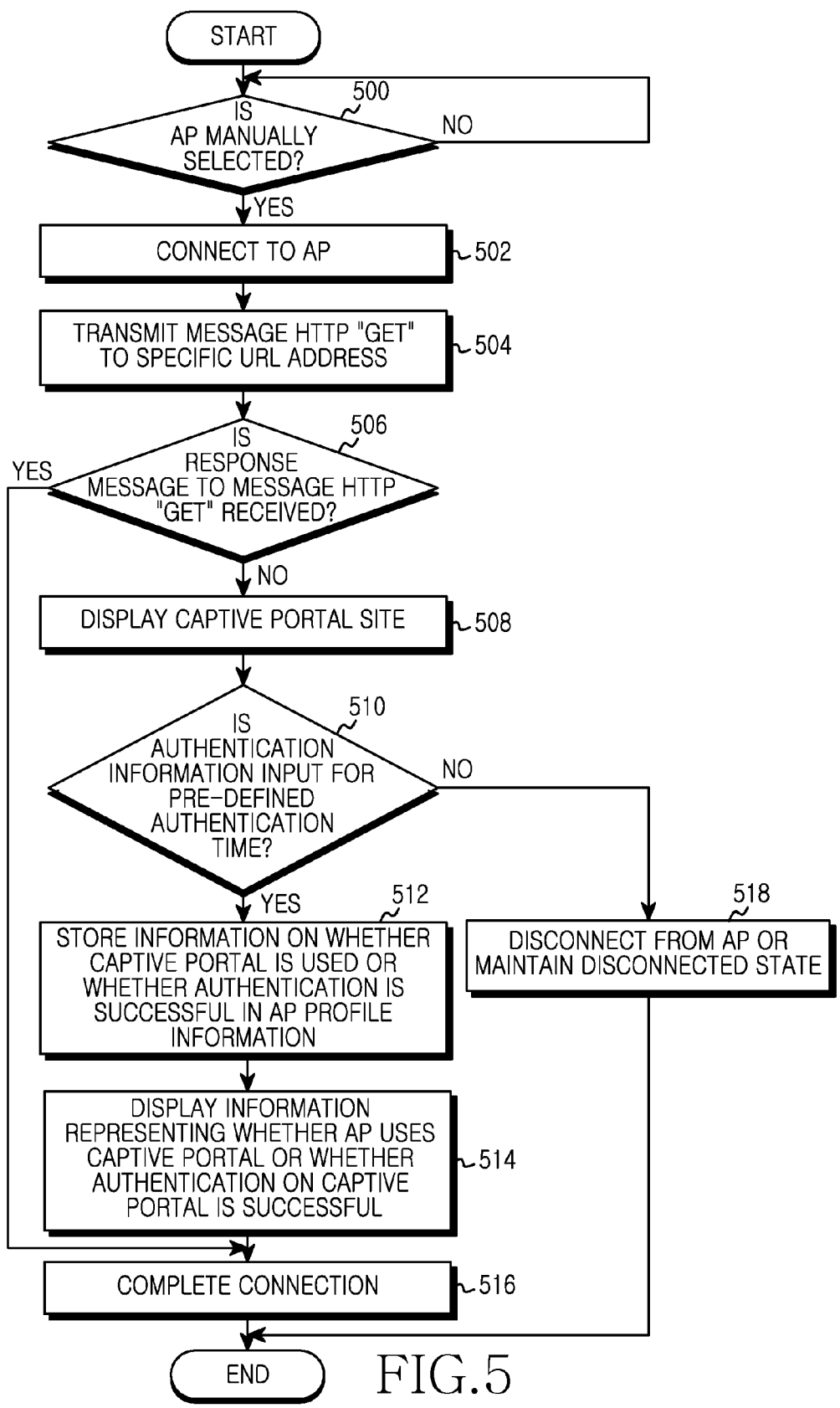
FIG. 5 illustrates an example sequence of steps for manually connecting to an access point by an electronic device according to other various embodiments of the present disclosure.

FIG. 5 illustrates an example sequence of steps for manually connecting to an access point by an electronic device according to other various embodiments of the present disclosure.

Referring to FIG. 5, in step 500, when a corresponding AP is manually selected by a user input from a list of APs, the application processor 202 may proceed to step 502 and perform a connection to a selected AP. The application processor 202 may transmit the message HTTP "GET" to the specific address and check whether a response message to the message HTTP "GET" is received in step 504.

If the response to the HTTP "GET" message is received in step 506, the application processor 202 may proceed to step 508 and open a captive portal authentication page corresponding to redirection message and display the page on a screen. If no response to the HTTP "GET" message is received, then in step 516, the application processor 202 may complete the connection to the AP. In other words, when the response message to the message HTTP "GET" is received, it may be determined that the AP uses captive portal authentication, and when the response message to the message HTTP "GET" is not received, it may be determined that the AP does not use captive portal authentication.

In step 510, when user authentication information (e.g., ID and PW) is input to a captive portal authentication page for a pre-defined illustrates an example sequence of steps for time (assuming that the user authentication information is valid and accurate), then in step 512, the application processor 202 may store in the profile information captive portal authentication information on the selected and connected AP, such as, for example, at least one of information on whether the AP uses a captive portal and whether captive portal authentication is successful.

In step 510, when user authentication information (e.g., IS and PW) is not input to a captive portal authentication page for a pre-defined authentication time in step 510, the application processor 202 may proceed to step 518 and disconnect from the AP or maintain a disconnected state if one already exists.

The application processor 202 may display information on whether the selected AP uses captive portal authentication or whether the captive portal authentication is successful, in step 514. For example, as shown in FIG. 9A (which will be described further below), it is possible to display information on whether the selected AP uses captive portal authentication or whether the captive portal authentication is successful using an indicator (element 910 of FIG. 9A). This may be displayed on a state display region showing a signal intensity of an antenna, a battery state, and a WLAN connectivity by using indicators. In various embodiments of the present disclosure, it is possible to show information on whether the selected AP uses captive portal authentication or whether the captive portal authentication is successful to a user through a message box or a popup window.

In step 516, the application processor 202 may complete the connection to the AP.

Also, after completing the connection to the AP, the application processor 202 may regularly transmit a message HTTP "GET" to a specific address, receive a response to the message HTTP "GET." If a redirection message to a captive portal authentication page is received, the application processor 202 may update captive portable authentication state information on the AP on the profile information and display a result by using, for example, the indicator 910 of FIG. 9A.

Figure 6:
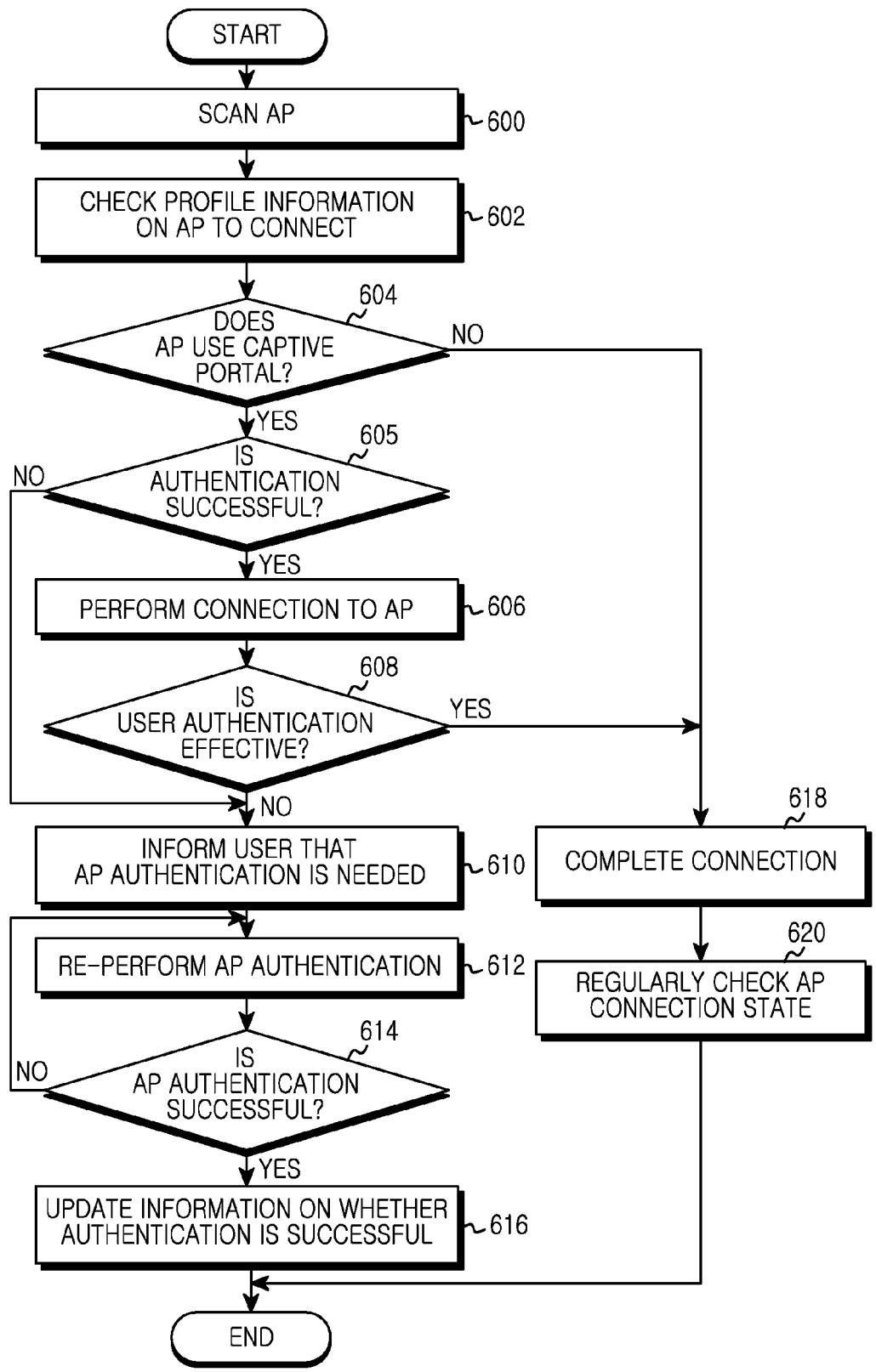
FIG. 6 illustrates an example sequence of steps for connecting to an access point by an electronic device by using an AP profile according to various embodiments of the present disclosure.

FIG. 6 illustrates an example sequence of steps for connecting to an access point by an electronic device by using an AP profile according to various embodiments of the present disclosure.

Referring to FIG. 6, in step 600, the application processor 202 may perform an AP scan operation through the RF processing unit 240 and search for APs near the electronic device 100.

In step 602, the application processor 202 may check profile information on an AP to connect among APs discovered during the search. In one example, if an AP is chosen for connection, the application processor 202 may check whether the AP has used a captive portal technology in a previous connection, based on information on whether the captive portal technology has been used for previously connected APs, and whether web authentication based on the captive portal authentication has been previously successful, based on information present in the profile information on the AP.

If the AP has used the captive portable technology in the previous connection in step 604, then in step 605, the application processor may determine whether authentication on the captive portal was successful in the previous connection. If in step 604, the AP has not used the captive portable technology in the previous connection, the application processor 202 may proceed to step 618 and complete the AP connection.

In step 620, the application processor 202 may regularly check an AP connection state after completing the AP connection. For example, after regularly checking a redirection message and checking whether existing authentication is expired, the application processor 202 may store information on an authentication state, in profile information. In addition, if an existing captive portal authentication has expired, it is possible for a user to select re-authenticate or disconnect from a corresponding AP via a notification dialogue.

If authentication on the captive portal has been successful in the previous connection in step 605, the application processor may proceed to step 606, and if authentication on the captive portal has been unsuccessful in the previous connection, the application processor may proceed to step 610.

In step 606, the application processor 202 may connect to the AP through the RF processing unit 240, and in step 608, the application processor 202 may determine whether user authentication on the previous connection on the captive portal is presently effective. In various embodiments of the present disclosure, whether the user authentication is effective may be determined by checking a redirection message received from the connected AP. In various embodiments of the present disclosure, the application processor 202 may check and determine a pre-stored user authentication expiration period.

When user authentication on the previous connection on the captive portal is effective in step 608, the application processor 202 may proceed to step 618 and complete an AP connection.

When user authentication on the previous connection on the captive portal is not effective in step 610 (meaning that, for example, a user authentication period has expired), the application processor 202 may proceed to step 610 and inform a user that AP authentication is needed or captive portal authentication on the AP has been expired. In this example, informing the user that AP authentication is needed or captive portal authentication on the AP has been expired may mean that an automatic re-connection to the AP is not subsequently performed.

In various embodiments of the present disclosure (as shown in FIG. 9B, as will be described further below), it is possible to display that captive portal authentication on a corresponding AP has expired by using an indicator (element 920 of FIG. 9B). The indicator may be displayed on a state display region displaying a signal intensity of an antenna, a battery state, and a WLAN connectivity by using indicators. In various embodiments of the present disclosure, it is possible to inform a user that captive portal authentication on a corresponding AP has been expired by using a message box or a popup window.

The application processor 202 may re-perform AP authentication in step 612. For example, it is possible to provide user authentication information to the server 115 through a captive portal site corresponding to a redirection message and receive feedback thereon.

When authentication is unsuccessful in step 614, the application processor 202 may return to step 612.

When authentication is successful in step 614, the application processor 202 may proceed to step 616 and update profile information on whether corresponding captive portal authentication is successful.

Figure 7:
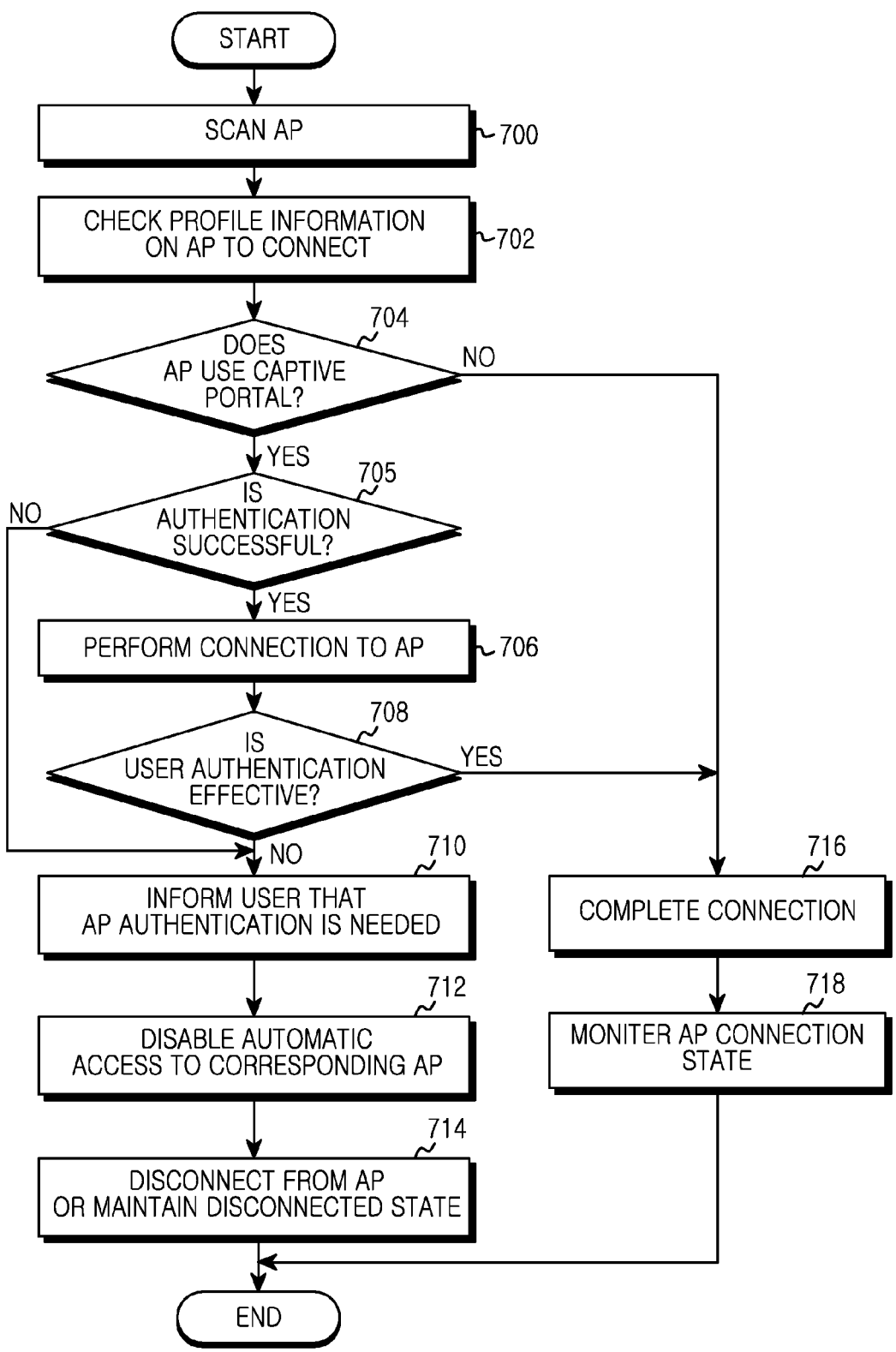
FIG. 7 illustrates an example sequence of steps for connecting to an access point by an electronic device by using an AP profile according to other various embodiments of the present disclosure.

FIG. 7 illustrates an example sequence of steps for connecting to an access point by an electronic device by using an AP profile according to other various embodiments of the present disclosure.

Referring to FIG. 7, in step 700, the application processor 202 may perform an AP scan operation through the RF processing unit 240 and search for APs near the electronic device 100.

If one of the APs found as a result of the search is designated for connection, the application processor 202 may check profile information on the AP in step 702. For example, the application processor 202 may determine whether the AP has used a captive portal technology in a previous connection, based on information indicating, for example, whether captive portal technology was used for previously connected Aps, and whether captive portal web authentication has been successful in connections. This information may be stored in the profile information on the AP.

If in step 704, it is determined that the AP has used the captive portable authentication in the previous connection, then in step 705, the application processor may check whether authentication on the captive portal was successful in the previous connection. If it is determined in step 704 that the AP has not used the captive portable authentication in the previous connection, the application processor may proceed to step 716 and complete an AP connection. In step 718, the application processor 202 may monitor the AP connection state after completing the AP connection. For example, after regularly checking for a redirection message and detecting whether existing authentication is expired, the application processor 202 may store information on an authentication state in the profile information. In addition, if existing captive portal authentication has expired, it is possible for a user to re-authenticate or disconnect from a corresponding AP through a notification dialogue.

If authentication on the captive portal has been successful in the previous connection in step 705, the application processor may proceed to step 706, and if authentication on the captive portal has been unsuccessful in the previous connection, the application processor may proceed to step 710.

The application processor 202 may connect to the AP to connect through the RF processing unit 240 in step 706, and may check whether user authentication on the previous connection on the captive portal is effective in step 708. In various embodiments of the present disclosure, whether the user authentication is effective may be determined by checking a redirection message received from the connected AP. In various embodiments of the present disclosure, the application processor 202 may check and determine a pre-stored user authentication expiration period.

When user authentication on the previous connection on the captive portal is effective in step 708, the application processor 202 may proceed to step 710 and complete the AP connection. In various embodiments, after completing the AP connection, a redirection message is regularly checked, and after checking whether existing authentication is expired, it is possible to store information on an authentication state, in profile information.

On the contrary, when user authentication on the previous connection on the captive portal is not effective in step 708, i.e., a user authentication period is expired, the application processor 202 may proceed to step 710 and inform a user that AP authentication is needed or captive portal authentication on the AP has been expired. In this example, informing the user that AP authentication is needed or captive portal authentication on the AP has been expired may include a meaning that an automatic re-connection to the AP is not performed later.

In various embodiments of the present disclosure, it is possible to display that captive portal authentication on a corresponding AP has been expired by using an indicator (such as element 920 of FIG. 9B), on a state display region displaying a signal intensity of an antenna, a battery state, and a WLAN connectivity by using indicators. In various embodiments of the present disclosure, it is possible to inform a user that captive portal authentication on a corresponding AP has been expired using a message box or a popup window.

The application processor 202 may delete information on the connected AP (e.g., step 307 of FIG. 3) from the profile information or prevent future automatic connections to the AP later, as shown in step 712. In various embodiments of the present disclosure, it is possible to prevent an automatic connection to the AP by disabling the automatic connection function.

In various embodiments of the present disclosure, steps 710 and 712 may be performed independently or together.

The application processor 202 may be disconnected from an AP (that was connected to in step 706 above) or maintain a disconnected state if one already exists, in step 714.

The methods according to embodiments described in the following claims and/or the specification may be implemented in hardware, software, or a combination thereof If the methods are implemented in software, a computer readable storage medium storing one or more programs (software modules) may be provided. The one or more programs stored in the computer readable storage medium are configured to be able to be executed by one or more processors in the electronic device. The one or more programs may include instructions that perform the methods according to the embodiments described in the following claims and/or the specification.

Such a program (software module, software) may be stored in a random access memory, a non-volatile memory including a flash memory, a read only memory (ROM), an electrically erasable programmable read only memory (EEPROM), a magnetic disc storage device, a compact disc-ROM (CD-ROM), a digital versatile disc (DVD), other types of optical storage devices, or a magnetic cassette. Alternatively, such a program may be stored in memories including combinations of some or all of these. Also, each memory may also be in plural forms.

Also, such a program may be stored in an attachable storage device that may access the electronic device through a communication network such as an internet, an intranet, a local area network (LAN), a wide LAN (WLAN), or a storage area network (SAN), or a communication network including combinations thereof. Such a storage device may access the electronic device through an external port.

Also, a separate storage device on the communication network may access a portable electronic device.

FIG. 8 illustrates an example network configuration screen according to various embodiments of the present disclosure. FIG. 8 shows a list of APs on a wireless network configuration screen. The APs in the list may be APs found through a scan operation and previously connected APs. In particular, the previously connected APs AP-1 to AP-3 may show information on whether captive portal authentication has been used in previous connections and whether the captive portal authentication has been successful. For example, information on the AP-1 may be indicated by a state icon, an indicator 820 or a text 810 representing that in previous connections, captive portal authentication has been used and successful. Information on the AP-2 may be indicated by a state icon, an indicator 820 or a text 810 representing that in a previous connection, captive portal authentication has been used and been unsuccessful. In addition, information on the AP3 may be indicated by a state icon, an indicator 820 or a text 810 representing that in a previous connection, captive portal authentication has not been used.

FIGS. 9A and 9B illustrate example screens showing information on whether a captive portal is used and whether authentication is successful upon access to a corresponding AP according to various embodiments of the present disclosure.

Referring FIG. 9A, after completing an AP connection, it is possible to display by using the indicator 910 that a corresponding AP uses captive portal authentication, on a state display region displaying a signal intensity of an antenna, battery remains, and a WLAN connectivity by using indicators.

Referring FIG. 9B, it is possible to display by using the indicator 920 that captive portal authentication on the corresponding AP has expired on a state display region 930 displaying a signal intensity of an antenna, battery remains, and a WLAN connectivity by using indicators. Accordingly, a user may intuitively recognize that an automatic re-access to the corresponding AP will not be performed.

FIG. 10 illustrates the profile details of a corresponding AP according to various embodiments of the present disclosure. Referring to FIG. 10, profile information may include an AP's 'MAC address' 1000, 'internet availability' 1001, 'authentication information' 1002, and a 'service limitation' 1003. According to embodiments of the present disclosure, the profile information may further include at least one of pieces of information 1004 on whether an AP uses a captive portal technology and information 1005 on whether web authentication based on the captive portal technology is successful, in addition to the information above.

FIG. 11 illustrates an example captive portal authentication screen according to various embodiments of the present disclosure. FIG. 11 shows an example of a captive portal site that automatically opens within a web browser of the electronic device 100, after connection to an AP, but before full access is granted to an internet service. For example, when a user opens the web browser by using the electronic device and attempts to access the internet, a page that requires captive portal authentication may be automatically displayed. A user may enter user ID and password on a captive portal authentication site, as illustrated in FIG. 11. In various embodiments of the present disclosure, the captive portal authentication site may perform user authentication, demand payment or show an allowed usage policy.

It is possible to prevent AP connection in which user authentication on the captive portal is presently not effective based on a connection history of an AP that uses a captive portal technology.

A method of an electronic device, the method comprising obtaining information on a communication network to connect; determining whether there is the information in a profile, wherein the profile comprises authentication information representing whether a communication network previously connected to the electronic device is authenticated through an authentication server; and automatically accessing the communication network to connect by the electronic device when it is determined based on a determination result that the information is authenticated through the authentication server.

In various embodiments of the present disclosure, the authentication information comprises at least one of information on whether the connected communication network uses a technology associated with the authentication server and information on whether authentication based on the authentication server is successful.

In various embodiments of the present disclosure, the automatically accessing of the communication network to connect comprises: checking whether the communication network to connect uses a technology associated with the authentication server; and checking whether the communication network to connect is successful in authenticating based on the technology associated with the authentication server.

In various embodiments of the present disclosure, the automatically accessing of the communication network to connect comprises showing information informing that authentication on the communication network is needed when the authentication is expired.

In various embodiments of the present disclosure, the checking of whether the communication network to connect is successful comprises, when the authentication is unsuccessful: inactivating an automatic access function of the communication network to connect; or deleting, from the profile, information on the communication network to connect.

In various embodiments of the present disclosure, the showing of the information comprises: inactivating an automatic access function of the communication network to connect; or deleting, from the profile, information on the communication network to connect.

In various embodiments of the present disclosure, the automatically accessing of the communication network to connect comprises regularly checking whether the authentication is expired.

In various embodiments of the present disclosure, the automatically accessing of the communication network to connect comprises showing information related to re-authentication or a disconnection when the authentication is expired. A method of connecting to a communication network by using an electronic device, the method comprising: attempting a connection to one access point (AP) by using AP profile information; determining whether the one AP uses a captive portal technology; determining based on the AP profile information whether authentication through a captive portal in a previous connection to the one AP is successful, when the one AP uses the captive portal technology; limiting a connection to the one AP when the authentication through the captive portal in the previous connection is unsuccessful.

In various embodiments of the present disclosure, the limiting of the connection to the one AP comprises: inactivating an automatic access function for the one AP; or deleting, from the AP profile information, information on the one AP.

In various embodiments of the present disclosure, the method further comprising: determining whether the authentication through the captive portal is effective, when the authentication through the captive portal in the previous connection is successful; and limiting a connection to the one AP when the authentication through the captive portal is ineffective.

In various embodiments of the present disclosure, the method further comprising displaying a message box informing that authentication through the captive portal is needed.

In various embodiments of the present disclosure, the AP profile information comprises at least one of information on whether the one AP uses the captive portal technology and information on whether authentication based on the captive portable technology is successful.

In various embodiments of the present disclosure, the determining of whether the AP uses a captive portal technology comprises: transmitting a designated protocol message to a specified address; and determining whether a response message associated with the protocol message is received from the specified address, the determining of whether the response message associated with the protocol message is received comprising: determining that the at least one AP uses the captive portable technology when the response message to the protocol message is not received, and determining that the at least one AP does not use the captive portable technology when the response message is received.

In various embodiments of the present disclosure, the determining of whether the AP uses a captive portal technology comprises: determining that the at least one AP uses the captive portable technology when a message switching to an authentication server supporting the captive portable technology is received from the at least one AP, and determining that the at least one AP does not use the captive portable technology when the message is not received from the at least one AP.

An electronic device comprising: a control unit obtaining information on a communication network to connect and determining whether there is the information in a profile, wherein the profile comprises authentication information representing whether a communication network previously connected to the electronic device is authenticated through an authentication server; an radio frequency (RF) processing unit automatically accessing the communication network to connect by the electronic device when it is determined based on a determination result that the information is authenticated through the authentication server.

In various embodiments of the present disclosure, the authentication information comprises at least one of information on whether the connected communication network uses a technology associated with the authentication server and information on whether authentication based on the authentication server is successful.

In various embodiments of the present disclosure, the control unit comprises, for the automatically accessing the communication network to connect: checking whether the communication network to connect uses a technology associated with the authentication server; and checking whether the communication network to connect is successful in authenticating based on the technology associated with the authentication server.

In various embodiments of the present disclosure, the control unit comprises showing information informing that authentication on the communication network is needed, when the authentication is expired.

In various embodiments of the present disclosure, the control unit comprises, for the checking of whether the communication network to connect is successful: inactivating an automatic access function of the communication network to connect when the authentication is unsuccessful; or deleting, from the profile, information on the communication network to connect.

In various embodiments of the present disclosure, the control unit comprises, for the showing of the information: inactivating an automatic access function of the communication network to connect; or deleting, from the profile, information on the communication network to connect.

In various embodiments of the present disclosure, the control unit comprises regularly checking whether the authentication is expired.

In various embodiments of the present disclosure, the control unit performs a control operation to show information related to re-authentication or a disconnection when the authentication is expired.

An electronic device comprising: an RF processing unit attempting a connection to one AP by using AP profile information; and a control unit configured to: determine whether the one AP uses a captive portal technology; determine based on the AP profile information whether authentication through a captive portal in a previous connection to the AP is successful, when the AP uses the captive portal technology; and limit a connection to the one AP when the authentication through the captive portal in the previous connection is unsuccessful.

In various embodiments of the present disclosure, the control unit comprises, for the limiting of the connection to the AP: inactivating an automatic access function for the one AP; or deleting, from the AP profile information, information on the one AP.

In various embodiments of the present disclosure, the control unit comprises: determining whether the authentication through the captive portal is effective, when the authentication through the captive portal in the previous connection is successful; and limiting a connection to the one AP when the authentication through the captive portal is ineffective.

In various embodiments of the present disclosure, the electronic device further comprising displaying a message box informing that authentication through the captive portal is needed.

In various embodiments of the present disclosure, the AP profile information comprises at least one of information on whether the one AP uses the captive portal technology and information on whether authentication based on the captive portable technology is successful.

In various embodiments of the present disclosure, the control unit comprises: transmitting a designated protocol message to a specified address; determining whether a response message associated with the protocol message is received from the specified address; determining that the at least one AP uses the captive portable technology when the response message to the protocol message is not received, and determining that the at least one AP does not use the captive portable technology when the response message is received.

In various embodiments of the present disclosure, the control unit comprises: determining that the at least one AP uses the captive portable technology when a message switching to an authentication server supporting the captive portable technology is received from the at least one AP, and determining that the at least one AP does not use the captive portable technology when the message is not received from the at least one AP.

Additionally, when re-accessing an AP supporting captive portal technology, undesired access is prohibited, and instead, a data service connection through a cellular network is provided, so it is possible to maintain continuity of internet access.

Additionally, because the electronic device 100 detects an authentication state using a captive portal authentication scheme (instead of IEEE 802.11 standard) and uses it as a WLAN connection standard, connection and management based on internet service availability are possible.

Additionally, upon an AP connection supporting captive portal technology, a guide for authentication may be provided to a user of the electronic device 100. Thus, it is possible to provide various user experiences to the user.

While particular embodiments have been described in the detailed description of the present disclosure, many variations may be made without departing from the ambit of the present disclosure. Therefore, the ambit of the present disclosure should not be limited to the above-described embodiments but be defined by the following claims and equivalents thereof.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

What is claimed is:

1. A method of connecting to a communication network by using an electronic device, the method comprising:
    detecting whether an access point (AP) requires a captive portal authentication before establishing a communication with the AP;
    retrieving AP profile information when the AP requires the captive portal authentication;
    detecting, based on the retrieved AP profile information, whether the captive portal authentication was successful in a previous communication with the AP;
    connecting the electronic device to the AP when the captive portal authentication was successful in the previous communication; and
    limiting an access to the AP when the captive portal authentication was not successful in the previous communication,
    wherein limiting access to the AP further comprises at least one of:
        deactivating an automatic access function for establishing communication to the AP; and
        deleting authentication information for the AP from the AP profile information, and
    wherein detecting whether an AP requires captive portal authentication further comprises:
    detecting that the AP requires the captive portal authentication when a message is received from the AP indicating a switch to an authentication server configured to execute captive portal authentication, and
    detecting that the at least one AP does not use the captive portal authentication when no message is received from the AP.

2. The method of claim 1, wherein captive portal authentication with the AP was successful in the previous communication with the AP, the method further comprising:
    detecting whether authentication through the captive portal is presently effective; and
    limiting access to the AP when captive portal authentication is not presently effective.

3. The method of claim 2, further comprising displaying on a screen of the electronic device a message indicating that the captive portal authentication is required.

4. The method of claim 1, wherein the AP profile information comprises at least one of:
    information indicating whether the AP requires the captive portal authentication; and
    information indicating whether authentication based on the captive portal authentication was previously successful.

5. The method of claim 1, wherein detecting whether an AP requires the captive portal authentication further comprises:
    transmitting a designated protocol message to a specified address; and
    detecting the AP requires the captive portal authentication when a response message is not received; and
    detecting the AP does not use the captive portal authentication when the response message is received.

6. The method of claim 1, wherein the profile comprises information indicating whether the captive portal authentication is required for the communication network, and whether authentication was successful in a previous attempt to access the communication network.

7. The method of claim 6, further comprising:
    displaying, on a screen of the electronic device, information for available communication networks including symbols indicating whether the captive portal authentication is required for each available communication network and whether authentication was successful in previous attempts to access each available communication network.

8. The method of claim 7, further comprising:
    displaying a state display region with state symbols representing at least one of a signal intensity of an antenna, a battery state and a WLAN connectivity;

displaying in the state display region an authentication symbol indicating whether the communication network requires the captive portal authentication; and displaying in the state display region an expiry symbol indicating when authentication information of the AP profile information has expired.

9. An electronic device comprising:

an RF processing unit configured to communicate with an access point (AP); and a processor configured to communicate with an access point (AP);
- detect whether the AP requires a captive portal authentication before establishing a communication with the AP,
- retrieve AP profile information when the AP requires the captive portal authentication,
- detect, based on the retrieved AP profile information, whether the captive portal authentication with the AP was successful in a previous communication with the AP,
- connect the electronic device to the AP when the captive portal authentication was successful in the previous communication; and
- limit access to the AP when the captive portal authentication was not successful in the previous communication, wherein the processor is further configured to execute at least one of:
- deactivating an automatic access function for establishing communication to the AP; and
- deleting authentication information for the AP from the AP profile information, and wherein detecting whether an AP requires captive portal authentication further comprises:
- detecting that the AP requires the captive portal authentication when a message is received from the AP indicating a switch to an authentication server configured to execute captive portal authentication, and
- detecting that the at least one AP does not use the captive portal authentication when no message is received from the AP.

10. The electronic device of claim 9, wherein the captive portal authentication with the AP was successful in the previous communication with the AP, the control unit further configured to:
- detect whether authentication through the captive portal is presently effective; and
- limit access to the AP when captive portal authentication is not presently effective.

11. The electronic device of claim 10, the control unit further configured to display on a screen of the electronic device a message indicating that the captive portal authentication is required.

12. The electronic device of claim 9, wherein the AP profile information comprises at least one of:
- information indicating whether the AP requires the captive portal authentication; and
- information indicating whether authentication based on the captive portal authentication was previously successful.

13. The electronic device of claim 9, wherein detecting whether an AP requires the captive portal authentication further comprises:
- transmitting a designated protocol message to a specified address; and
- detecting the AP requires the captive portal authentication when a response message is not received; and
- detecting the AP does not use the captive portal authentication when the response message is received.

14. The electronic device of claim 9, wherein the profile comprises information indicating whether the captive portal authentication is required for the AP, and whether authentication was successful in a previous attempt to access the AP.

15. The electronic device of claim 14, further comprising:
- displaying, on a screen of the electronic device, information for available APs including symbols indicating whether the captive portal authentication is required for each available AP and whether authentication was successful in previous attempts to access each available AP.

16. The electronic device of claim 14, further comprising:
- displaying a state display region with state symbols representing at least one of a signal intensity of an antenna, a battery state and a WLAN connectivity;
- displaying in the state display region an authentication symbol indicating whether the AP requires captive portal authentication; and
- displaying in the state display region an expiry symbol indicating when authentication information of the AP profile information has expired.

* * * * *